US 6,665,574 B2

(12) United States Patent
Farren

(10) Patent No.: US 6,665,574 B2
(45) Date of Patent: Dec. 16, 2003

(54) METHOD OF FORMING FINISHED PARTS UTILIZING STEREOLITHOGRAPHY TECHNOLOGY

(75) Inventor: Chris E. Farren, Whittier, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 275 days.

(21) Appl. No.: 09/847,761

(22) Filed: May 2, 2001

(65) Prior Publication Data

US 2002/0165635 A1 Nov. 7, 2002

(51) Int. Cl.[7] .............................................. G06F 19/00
(52) U.S. Cl. ...................... 700/120; 700/95; 700/97; 700/98; 700/118; 700/182
(58) Field of Search .................... 700/120, 182, 700/95, 97, 98, 118, 180, 186

(56) References Cited

U.S. PATENT DOCUMENTS

| 4,575,330 A | | 3/1986 | Hull ........................ 425/174.4 |
|---|---|---|---|
| 5,296,335 A | | 3/1994 | Thomas et al. ............. 430/320 |
| 5,365,996 A | | 11/1994 | Crook .......................... 164/45 |
| 5,458,825 A | * | 10/1995 | Grolman et al. ............ 700/120 |
| 5,598,340 A | | 1/1997 | Medard et al. ......... 364/468.27 |
| 5,603,797 A | | 2/1997 | Thomas et al. ........... 156/272.8 |
| 5,870,307 A | * | 2/1999 | Hull et al. .................. 700/182 |
| 5,937,265 A | * | 8/1999 | Pratt et al. ..................... 419/6 |
| 5,989,679 A | | 11/1999 | Souerhoefer ................. 428/116 |
| 5,997,681 A | * | 12/1999 | Kinzie ......................... 156/263 |
| 6,021,358 A | * | 2/2000 | Sachs ......................... 700/118 |
| 6,027,682 A | * | 2/2000 | Almquist et al. ........... 700/120 |

FOREIGN PATENT DOCUMENTS

WO   WO 96 33859   10/1996

* cited by examiner

Primary Examiner—Leo Picard
Assistant Examiner—Charles R Kasenge
(74) Attorney, Agent, or Firm—Stetina Brunda Garred & Brucker

(57) ABSTRACT

There is provided a method of forming a tool for performing a desired tooling task upon an unfinished part to form a finished part. The method may comprise the step of creating a computer model of the tool corresponding to the unfinished part. Moreover, the method may further comprise using the computer model to stereolithographically create the tool.

15 Claims, 3 Drawing Sheets

METHOD OF FORMING FINISHED PARTS UTILIZING STEREOLITHOGRAPHY TECHNOLOGY

CROSS-REFERENCE TO RELATED APPLICATIONS (Not Applicable)

STATEMENTS RE: FEDERALLY SPONSORED RESEARCH/DEVELOPMENT (Not Applicable)

BACKGROUND OF THE INVENTION

The present invention generally relates to methods of forming parts, and more particularly to an improved method of forming a finished part through the use of a tool generated via a computer aided design system.

The concept of rapid prototyping in commercial and military applications is well known. Rapid prototyping may have wide variety of applications in the aerospace industry, substantially extending to all forms of structural and manufacturing related operations. More specifically, rapid prototyping procedures are frequently used in manufacturing parts related to the field, namely, in construction and assembly of complex and sophisticated structures such as aircrafts or other forms of vehicles. Thus, rapid prototyping has become a vital and integral process in the aerospace industry, as well as other related industries.

More specifically, rapid prototyping maybe used during product development to verify design concepts and to conduct further testings therefrom. Typically, the design concepts generated for such purpose are developed based on engineering specifications. Depending on the set of engineering specifications, a particular design concept may be created. The engineering specifications will usually include the necessary product and design information so that the depicted illustration may portray an actual finished product to the highest precision and accuracy as possible.

In particular, the design may be created in any medium. However, a computer aided design system is generally used. When the design is generated in the computer aided design system, such design may be stored therein so that it may be retrieved later in time for reuse or be modified to reflect any subsequent design changes.

Moreover, rapid prototyping procedures may also incorporate the concept of stereolithography technology. As disclosed in U.S. Pat. No. 4,575,330 issued on Mar. 11, 1986, stereolithography generally refers to a method of rapidly fabricating a three-dimensional object (e.g., a prototype tool) in a layer by layer fashion. Stereolithography technology traditionally involves a laser beam that may be directable by computer control, such as the computer aided design system as described above.

The laser beam may be positionable relative to a photopolymer resin medium. The laser beam may traverse across the resin medium to selectively cure the resin to form the three-dimensional object through the accumulation of incremental layers of cured resin. Specifically, upon exposure to the laser beam, the resin may rapidly polymerize, or solidify. Thus, rapid prototyping procedures oftentimes meld computer modeling techniques with the actual creation of three-dimensional models.

However, rapid prototyping procedures have their share of limitations. Even though the application of rapid prototyping procedures has proved to be invaluable in certain industries, the resin models that result therefrom are generally characterized as having less strength than the strength of materials designated for the finished parts. Therefore, the resin models produced via stereolithography have been utilized for visualization purposes to verify production intent, rather than for functional usage.

In addition, the finished parts may further need to be adapted to correspond to a selected work surface, such as an aircraft structure. The finished parts and the work surface must be complimentary or compatible with each other to maximize their intended utilities. However, the finished parts and the work surface are often incompatible with each other due to their respective complex geometries and configurations. Simply put, the finished parts, after enduring through arduous manufacturing, may not match their intended target, namely, the work surface. Such occurrence would diminish their utility, or even render them useless.

Even if the finished parts match or conform to the work surface, the cycle and labor time that must be expended to accomplish such purpose may be significant. Furthermore, the expense to provide the sized and conformed finished parts may be considerable. For example, such parts may further need to be defined to be attached to the work surface. A plurality of tooling tasks, such as drilling, sanding, cutting, bending or the like, may be necessary for adaptation to the work surface. The tooling tasks upon the finished parts may be done by trial-and-error process to achieve the desired arrangement to the work surface. Such process may require repetition and tedious toil. Thus, the resulting time and expense may be burdensome in view of the overall scheme.

When the work surface is marked by complex geometries and configuration, a direct adaptation approach of the finished parts thereto may be difficult and troublesome. As stated above, the work surface and the finished parts need to be strategically arranged with respect to each other to fully achieve their intended purposes when united. For instance, the finished parts oftentimes need to be specifically arranged in relation to the work surface. However, the engagement therebetween may be difficult due to the complex geometries and configuration of one of them, or even both. Thus, further time and expense may be inevitable in order to desirably adapt the finished part to the work surface.

Thus, there has long been a need in the industry, and in the aerospace industry in particular, for a method of forming a finished part that is sized and configured to properly engage a corresponding work surface utilizing computer modeling and stereolithography technology. In particular, there is a need to form the finished part without performing post-machining in order to achieve cost-saving and efficient manufacturing thereof.

The present invention addresses and overcomes the above-described deficiencies by providing a method that utilizes computer modeling and stereolithography technology to mitigate post-machining of the formed finished part. More specifically, an initial part is adapted for engagement to a stereolithographically-created tool for performing a desired tooling task thereupon to form the finished part that is conformable to the work surface. In this respect, not only does the present invention mitigate the need to use expensive post-machining, but it also minimizes labor and cycle time of forming the finished part.

BRIEF SUMMARY OF THE INVENTION

In accordance with the present invention, there is provided a method of forming a tool for performing a desired tooling task upon an unfinished part to form a finished part. The method may comprise the step of creating a computer model of the tool corresponding to the unfinished part. Moreover, the method may further comprise using the computer model to stereolithographically create the tool.

Thereafter, the unfinished part maybe engaged to the tool to facilitate the performance of the desired tooling task upon the unfinished tool to form the finished part. The engaged tool and the unfinished part may be representative of an intermediate assembly.

More specifically, a computer aided design system may be accessed to retrieve the computer model of the tool corresponding to the unfinished part. In the alternative, tool parameters maybe derived to define the tool. The tool parameters maybe derivable to correspondingly size and configure the tool to the unfinished part. In addition, the tool parameters may be inputted into a computer aided design system. The tool parameters may be chosen from the group consisting of geometrical dimensions, size, thickness, texture, durability, shock resistance, dimensional stability, material characteristic, producibility, and combinations thereof.

In accordance with the methods employed in the present invention, there may further be a stereolithography apparatus. The computer model in the computer aided design system may be translated into tool commands for transmission, or communication, to the stereolithography apparatus. Such apparatus may comprise an irradiation source and a liquid medium, preferably photopolymer resin medium. The irradiation source may be responsive to the transmitted tool commands to move over the liquid medium that selectively transforms to a physical state upon exposure the irradiation source.

Furthermore, the tool may define a geometrical configuration. The unfinished part may be positioned in abutting contact to the tool. More particularly, the geometrical configuration of the tool may be adapted to receive the unfinished part when being positioned thereto. The unfinished part may be secured to the geometrical configuration of the tool after being positioned thereto for performing the desired tooling task thereupon to form the finished part.

In addition, the unfinished part may be manufactured by using the computer aided design system. More specifically, a computer model of the unfinished part may be created. Furthermore, the computer model of the tool may be created through the use of the computer model of the unfinished part. Or, in the alternative, a conventional factory manufactured unfinished part may be obtained. Part parameters defining the unfinished part may be derived to be inputted into the computer aided design system. There may further comprise a computer aided manufacturing machine, such as a computer numeric control system. The inputted part parameters may be used to formulate part commands for transmission, or communication, to the computer aided manufacturing system.

BRIEF DESCRIPTION OF THE DRAWINGS

These as well as other features of the present invention, will become more apparent upon reference to the drawings wherein.

DETAILED DESCRIPTION OF THE INVENTION

Figure 1:
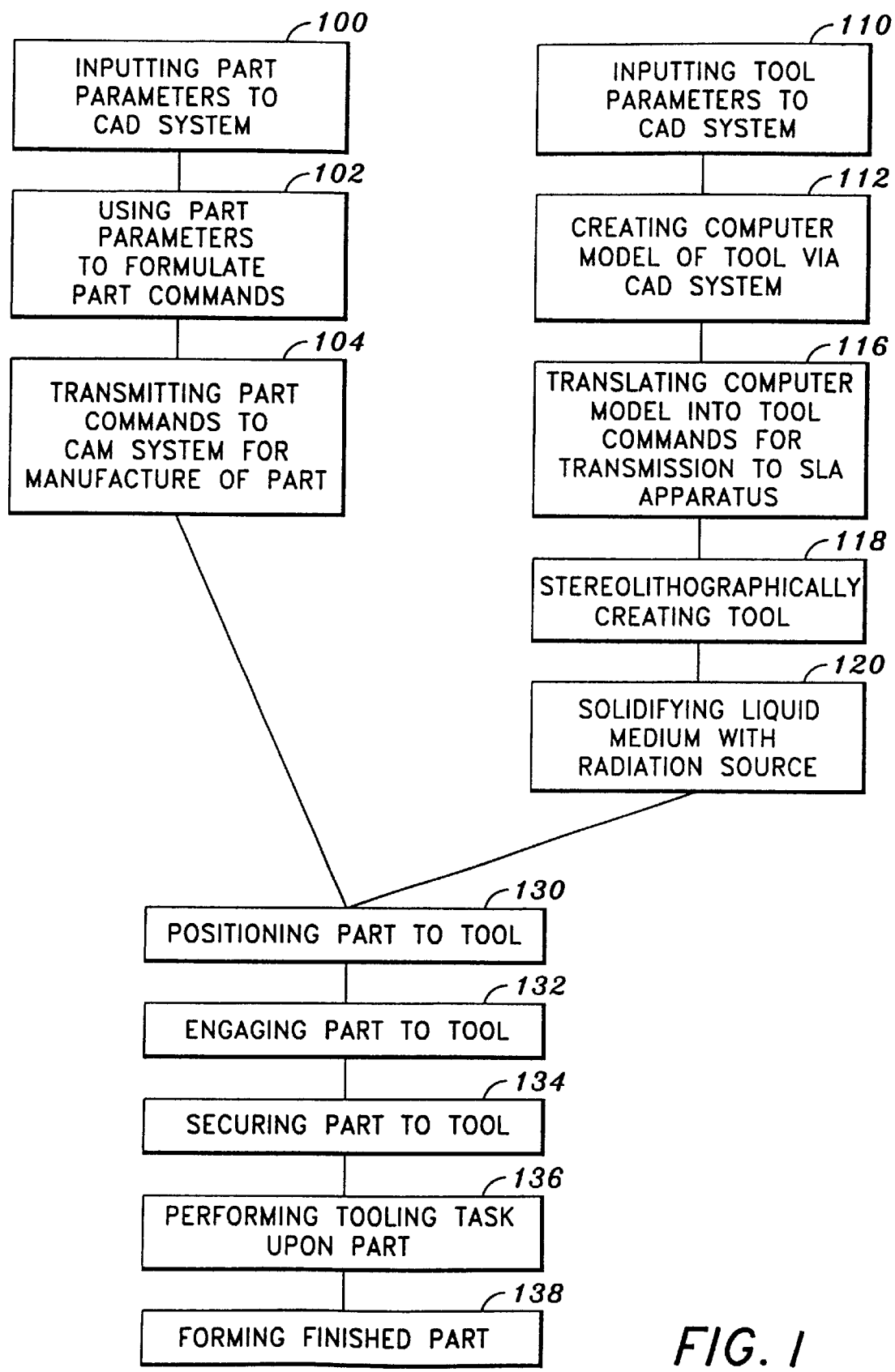
FIG. 1 is a flow diagram of the steps employed to form a finished part in accordance with a preferred embodiment of the present invention.

Referring now to the drawings wherein the showings are for purposes of illustrating preferred embodiments of the present invention only, and not for purposes of limiting the same, FIG. 1 is a flow diagram of the steps employed to form an exemplary finished part 10 (shown in FIG. 3) in accordance with a preferred embodiment of the present invention. As will be discussed below, the finished part 10 is specifically sized and configured to cooperatively engage a corresponding work surface 40. Moreover, the finished part 10 may be derived from an unfinished part 20 utilizing a stereolithographically-created tool 30. In this regard, the finished part 10 may be formed to have a variety of shapes, configurations, geometries and textures depending on the provided shape of the work surface 40. The finished part 10 may be fabricated from any material such as metal, plastic, fiberglass, wood, or the like.

Figure 2:
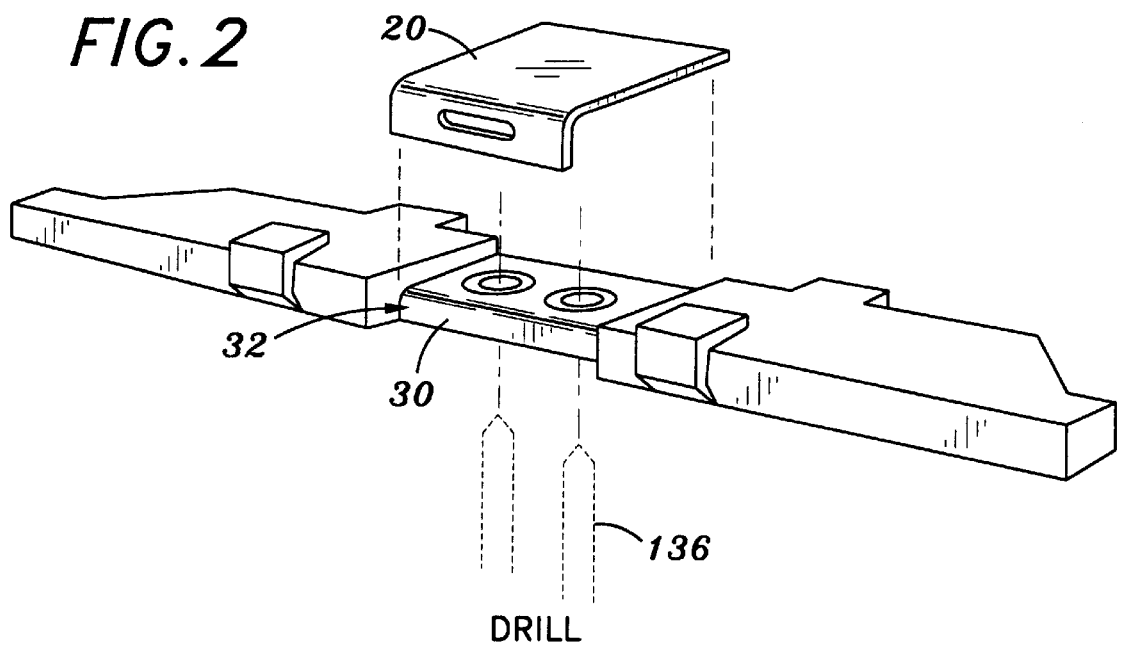
FIG. 2 is a perspective view of an exemplary stereolithographically-created tool formed in accordance with the present invention, further illustrating an unfinished part with which the tool is used.
Figure 3:
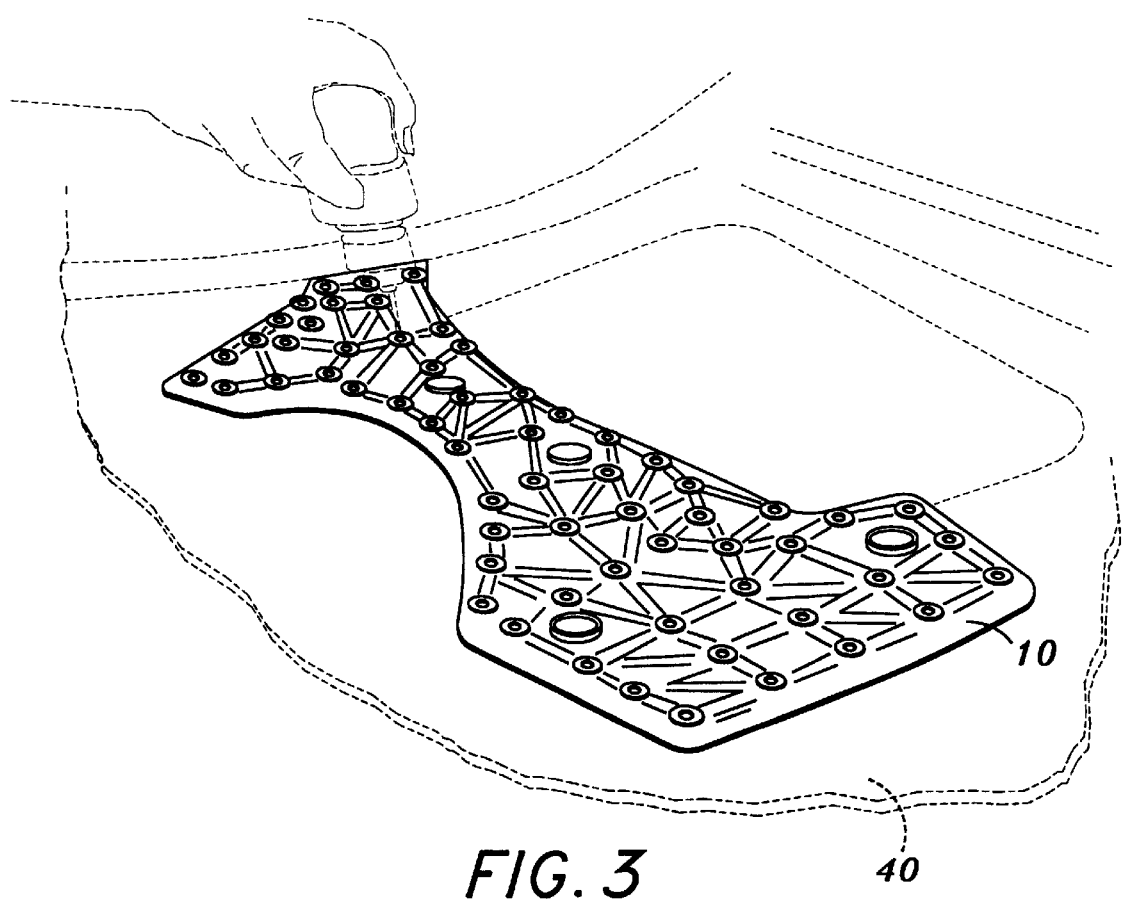
FIG. 3 is a perspective view of an exemplary finished part formed through the use of the tool.

Referring now to FIGS. 1 through 3, as the finished part 10 may be any general shape depending upon the shape of the work surface 40, it is understood that the finished part 10 as depicted is exemplary in nature, and it is concept of correspondingly forming the finished part 10 to the work surface 40 that should be appreciated. Moreover, not all steps described in FIG. 1 have to be taken. Rather, a manufacturer may choose to undergo only selected ones of the steps described therein. More specifically, it would be obvious to one of ordinary skill in the art that certain ones of the steps described in FIG. 1 maybe altered, modified, or rearranged to arrive at the same result. It is the concept of arriving at the finished part 10 by utilizing and incorporating computer modeling and stereolithography technology that should be appreciated.

More particularly, the manufacturer may obtain an unfinished part 20. Such part 20 may be any standard hardware component part readily available in factory environments. In the alternative, the unfinished part 20 may be created to specifically tailor to the manufacturer's desires and generally conform to the shape of the work surface 40. To reiterate, the unfinished part 20 may simply be viewed as a standard hardware component already fabricated for its intended regular use, or in the alternative, be fabricated with individually tailored specifications for a particular purpose.

If the manufacturer decides to fabricate the unfinished part 20, then it is recommended that a computer aided design system be utilized. It is contended that the computer aided design system, and its functions, are generally known in the art. However, it will be contemplated by those of ordinary skill in the art that the utilization of computer aided design system is not necessary. For instance, the manufacturer may simply choose to construct the unfinished part 20 via conventional machining operations. But, constructing the unfinished part 20 by computer means may facilitate the intended process.

The manufacturer may input part parameters into the computer aided design system (step 100). The inputted part parameters may define the unfinished part 20 desired to be manufactured. The manufacturer may decide to substantially form the unfinished part 20 by inputting the desired part parameters into the computer aided design system. Such parameters of the unfinished part 20 may jointly and severally include, but is not limited to, geometrical dimensions, size, thickness, texture, durability, dimensional stability, material characteristic, producibility, and the like. As can be seen, a clear advantage of using the computer aided design system is that the part parameters inputted for manufacturing the unfinished part 20 may be stored therein so that they may be subsequently retrieved for reproduction purposes.

There may further be provided a computer aided manufacturing system. It is realized that the computer aided manufacturing system, and its functions, are generally known in the art. One type of such system may be a computer numeric control system, as there are other types of such system in the conventional art. After inputting the part parameters into the computer aided design system for the purpose of generating the unfinished part 20, the part parameters may be used to formulate computer commands (step 102) for transmission to the computer aided manufacturing system (step 104). Such computer commands, which will be referred to as part commands, maybe transmitted, or communicated to the computer aided manufacturing system to fabricate the unfinished part 20 desired by the manufacturer.

When the unfinished part 20 is generated by the above process, it may be preferable, but does not have to be, to generally size and configure the unfinished part 20 to that of the work surface 40. In particular, the manufacturer may input the part parameters in a way that the unfinished part 20 is substantially sized and configured to correspond to a configuration of the work surface 40. In this way, the formation of the finished part 10 will be facilitated, as will be soon described.

In one embodiment, the manufacturer may create the tool 30 after obtaining the unfinished part 20. Irrespective of the manner in which the unfinished part 20 is produced (e.g. computer generated or factory produced), the tool 30 should be created with an ultimate objective of facilitating the transformation of the unfinished part 20 into the finished part 10. More specifically, the tool 30 should be formed to serve as a fixture-like device for turning the unfinished part 20 into the finished part 10. As will be immediately described below, the tool 30 is designed around the unfinished part 20 so as to facilitate the desired tooling task (e.g., drilling operation) upon the unfinished part 20.

More particularly, the unfinished part 20 should be observed with close scrutiny in order to set the parameters of the tool 30. Depending on the unfinished part 20, the tool 30 should be constructed in such a way that a correspondence between the two is achieved. Simply put, the tool 30 is manufactured to engage the unfinished part 20 in a mating-like fashion so that the desired tooling task may be performed on the unfinished part 20. Therefore, it may be said that the unfinished part 20 determines the formation (e.g., shape, angular orientation, etc.) of the tool 30.

With the goal of fabricating the tool 30 that is correspondingly mateable with the unfinished part 20, an initial step of accomplishing such goal would be to define the unfinished part 20. The unfinished part 20 should be carefully observed to analyze various characteristics and boundaries thereof. More specifically, the unfinished part 20 should not only be scrutinized as to its general shape and configuration, but also as to its minor descriptions such as angular orientations, geometrical dimensions, and texture.

Furthermore, the unfinished part 20 should also be analyzed for its adaptability characteristics to the work surface 40. Since the unfinished part 20 is transformed into the finished part 10 for the purpose of being adapted to the work surface 40, its adaptability characteristics (e.g., points of attachment, engagement, or the like) should be defined. By defining the adaptability characteristics of the unfinished part 20, the tool 30 may be fabricated in a way as to facilitate the transformation of the unfinished part 20 into the finished part 10 that is already configured for the work surface 40. For example, if the finished part 10 is to be fastened to the work surface 40, its fastening points to the work surface 40 should be determined in the unfinished part 20 stage. As will be discussed below, the tool 30 may be constructed (e.g., as a template-like structure) to facilitate the definement of the adaptability characteristics of the unfinished part 20, such as the fastening points. By utilizing the tool 30 to define the adaptability characteristics of the unfinished tool 20, an active tooling task, such as a drilling operation, may be performed upon the unfinished part 20 (e.g., on the fastening points) so that the transformed finished part 10 is adaptable to the work surface 40.

In a different embodiment, but utilizing the similar concepts depicted above, the actual unfinished part 20 may not be needed to create the corresponding tool 30. More specifically, a computer model of the unfinished part 20 may be used to create the tool 30. As already mentioned, the part parameters may be inputted into the computer aided design system to generate the computer model of the unfinished tool 20. In view of the computer model of the unfinished part 20, the corresponding tool 30 may be created to not only engage the unfinished part 20, but also to aid in defining the adaptability characteristics of the unfinished part 20.

After defining the unfinished part 20, the tool 30 may be created by generating a computer model of the tool 30 (step 114). More particularly, tool parameters may be inputted into the computer aided design system (step 110) in order to create the computer model of the tool 30. The inputted tool parameters may define the computer model of the tool 30, in which such model is a reflection of the tool 30 that is utilized in forming the finished part 10.

The tool parameters are derived to create the computer model of the tool 30 that may be processed in forming a tool 30 compatible with the unfinished part 20. In other words, the tool parameters should be derived with an objective of generating the tool 30 that is adapted to mate with the unfinished part 20. More specifically, the tool parameters should be derived to produce the tool 30 that defines the complimentary characteristics (e.g., shape, configuration, angular orientation, etc.) to that of the unfinished part 20 for accomplishing mateable arrangement therewith. In addition, the tool 30 may further be created to tangibly define the points of attachment where the adaptability characteristics (e.g., fastening points) of the unfinished part 20 may align or conform to. By performing the desired tooling task upon the adaptability characteristics (e.g., fastening points) of the unfinished part 20, the resulting finished part 10 may easily be adapted to the work surface 40. The tool parameters may jointly and severally include, but is not limited to, geometrical dimensions, size, thickness, texture, durability, shock resistance, dimensional stability, material characteristic, and producibility. As will be described in more detail below, the tool 30 may be created according to its tool parameters via utilization of stereolithography technology.

The methodology of creating the tool 30 in view of the unfinished part 20, or its computer generated model, yields a plurality of advantages that the prior art methodologies do not provide. For one, a standardized simplistic procedure may be applied in producing finished parts 10 that may be adaptable to a given work surface 40 without having to do trial-and-error process. By forming the finished part 10 that is already predisposed to the given work surface 40, a further adaptation of the finished part 10 (e.g., sanding cutting, bending) may not be necessary. Thus, after expending much labor and expense in forming the finished part 10, the risk of damaging the finished part 10 may be greatly reduced.

Another of such advantage is the efficiency of the overall process in creating the finished part 10. After fabricating the tool 30 of the present invention as indicated above, a number of unfinished parts 20 maybe transformed into the finished parts 10 thereby. In other words, the tool 30 may serve as a template-like structure for turning not only one unfinished part 20 into finished part 10, but may continually perform the same functions for a number of other similar unfinished parts 20. Such function may mitigate the repetitious and tedious toil of particularizing one finished part 10 at a time to the given work surface 40. By utilizing the methods employed in the present invention, the desired finished parts 10 may be mass-produced using one fabricated tool 30.

Moreover, the tool 30 of the present invention may facilitate the problem of adapting the finished part 10 to a complexly configured work surface 40. When the work surface 40 is marked by complex geometries and configuration, the adaptation of the finished part 10 thereto may be difficult. Such occurrence may frequently result in the finished part 10 being incorrectly applied to the work surface 40 and may require many trial-and-error process before a correct application is reached. However, by creating and utilizing the tool 30 of the present invention that facilitates in defining the adaptability characteristics of the finished part 10 in its unfinished part 10 stage, an adaptability of the finished part 10 to the work surface may be easily achieved. Therefore, the methods utilized in the present invention may improve the time efficiency and cost in manufacturing the desired finished parts 10.

As mentioned previously, the incorporation of stereolithography technology in rapid prototyping is generally known. Incorporating herein by reference the above disclosed U.S. Pat. No. 4,575,330 issued on Mar. 11, 1986 entitled "APPARATUS FOR PRODUCTION OF THREE-DIMENSIONAL OBJECTS BY STEREOLITHOGRAPHY," the concept of stereolithography technology is well known and discussed therein. Such reference will be relied upon in regards to specific details of stereolithography, and only the broad concept thereof will be utilized herein to better reflect the present invention, as stereolithography may be generally considered a conventional art in the field. Generally, there is provided a stereolithography apparatus for rapidly fabricating a three-dimensional object (e.g., a prototype tool) in a layer by layer fashion.

Furthermore, the stereolithography apparatus may comprise an irradiation source and a liquid medium. The irradiation source maybe configured to emit a laser beam, whereas the liquid medium maybe a photopolymer resin medium. In addition, as maybe conventionally accomplished, the generated computer model of the tool 30 may be translatable into computer commands (step 116). Such computer commands, which will from now on be referred to as tool commands, may be transmitted, or communicated to the stereolithography apparatus. In response, the stereolithography apparatus will stereolithographically-create the tool 30 (step 118) representative of the computer model reflected in the computer aided design system. Thus, the generated tool 30 maybe fabricated from the photopolymer resin material.

More specifically, the irradiation source may be positionable over the liquid medium. The irradiation source may be operative to respond to the transmitted tool commands from the computer aided design system by being movable in relation to the liquid medium. Such medium may selectively transform from a substantial liquid state to a substantial physical state, or solid state, upon exposure to the irradiation source. Simply put, the irradiation source may selectively and strategically solidify 120 the liquid medium to form the tool 30. Thereafter, the tool 30 maybe dried to conclude its solidifying 120 process. However, the tool 30 may omit the drying thereof. It will be contemplated by those of ordinary skill in the art that the irradiation source may output different types of lights, but an ultraviolet light may be preferable. However, as stated before, any omitted specific details in regards to the stereolithography technology may be found in the above incorporated U.S. Pat. No. '330, and only general concepts are disclosed herein in reference to the present invention.

After stereolithographically creating the tool 30, an engagement of the unfinished part 20 to such tool 30 may occur. It will be realized by one of ordinary skill in the art that stereolithography technology may form such tool 30 in a plurality of shapes, configurations, geometries, and the like. The tool 30 is formed with the purpose of facilitating the transition of the unfinished part 20 to a finished part 10 that is compatible with the work surface 40. For instance, the tool 30 may be used to hold the unfinished part 20 and the work surface 40 together while the desired tooling task is performed upon the unfinished part 20. However, as stated above, it may facilitate the overall process if the unfinished part 20 is generally formed to take the shape, geometry, and configuration of the work surface 40.

Figure 4A:
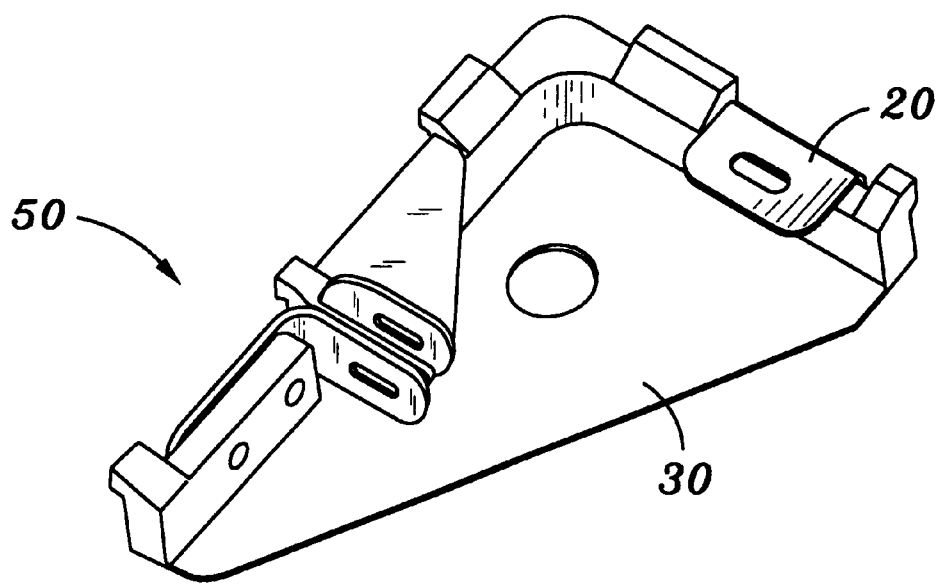
FIGS. 4A and 4B are perspective views of exemplary intermediate assemblies which each comprise an unfinished part as cooperatively engaged to a corresponding stereolithographically-created tool of the present invention.
Figure 4B:
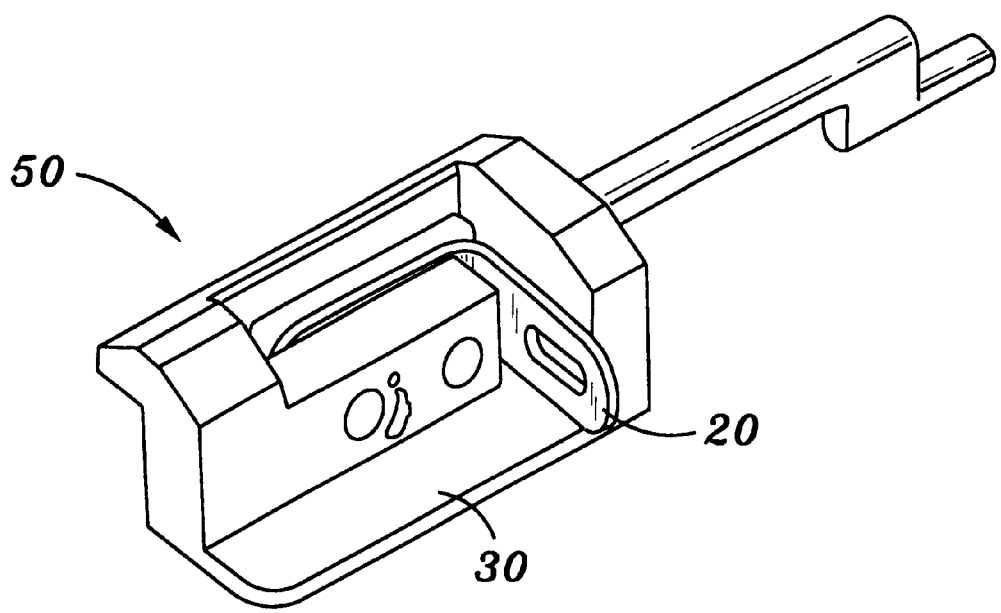

Referring now to FIGS. 4A and 4B, there are two exemplary portrayals of the unfinished part 20 when engaged to the stereolithographically-created tool 30 in order to create two different intermediate assemblies 50. It is significant to recognize that such portrayal are only symbolic depictions, and it is the idea of engaging the two 20,30 together that should be appreciated. There are a plurality of ways of achieving such objective, and the illustration that will now be described may be only one of such ways. As can be seen, the tool 30 may be defined by a number of different shapes, geometries, configurations, textures, and the like, in which will now be collectively referred to as geometrical configurations.

The tool 30 may define at least one geometrical configuration 32. As stated previously, such geometrical configuration 32 may be formed to be similar to that of the work surface 40, or simply formed to facilitate the arrangement of the unfinished part 20 to the work surface for the desired tooling task to be performed. Either way, the geometrical configuration 32 may be created to serve the unfinished part 20 in order to achieve the objective of the present invention.

More specifically, the geometrical configuration 32 may be sized and configured to receive the unfinished part 20 thereto. The unfinished part 20 maybe positioned in abutting contact to the tool 30 (step 130), wherein its geometrical configuration 32 may be operative to facilitate the arrangement of the unfinished part 20. Simply put, the geometrical configuration 32 of the tool 30 may engage 132 the unfinished part 20.

Subsequent to being positioned, the unfinished part 20 may be secured in its position. Such securing of the unfinished part 20 to the tool 30 may be accomplished in any manner, whether conventional or creative. For instance, adhesive tapes may be applied to the unfinished part 20 and the stereolithographically-created tool 30 to secure them 20, 30 together. Or, a clamp may be utilized to hold them 20, 30 securely together. The unfinished part 20 and the tool 30 may be secured together for the manufacturer to perform the conventional machining operations upon the unfinished part 20 to form the finished part 10 that may be adaptable to the work surface 40.

After the manufacturer performs the desired tooling task upon the unfinished part 20, the unfinished part 20 is customized to conform to the complex geometries, shapes, configurations, and the like, that the work surface, such as an aircraft structure, may define. After such customization, the unfinished part 20 evolves into the finished part 10, as shown in FIG. 3, which is just one exemplary depiction of such finished part 10.

By utilizing the process as set forth above, the finished part 10 may be directly applicable to conform and correspond to the work surface 40 in an easy manner. For example, the finished part 10 may yield a plurality of fastening locations, as many as seventy-two locations but not limited thereto, that would correspond to the fastener receiving locations of the work surface 40. Such matching features of the two 10, 40 would be advantageous in that it would mitigate any further trial-and-error procedures.

Moreover, the finished part 10, as exemplarily portrayed above, may significantly improve a geometrically complex manufacturing assembly process that had high tolerance installation requirements. The methodologies of the present invention may take a very costly conventional method to a rapid manufactured low cost method. It may greatly reduce in process flow, as high as 80%, and yield over 90% reduction in cost. It may also improve with an overall factory labor saving and over 95% reduction in defects and repair cost.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method of forming a tool for performing a desired tooling task upon an unfinished part to form a finished part, the method comprising the steps of:
   a) creating a computer model of the tool simulating a work surface configured to complement the finished part after manufacture of the finished part, the computer model of the tool corresponding to the unfinished part; and
   b) using the computer model to stereolithographically create the tool to engage and perform the desired tooling task upon the unfinished part to form the finished part engageable to the work surface without necessitating any substantial post-manufacture operation thereon.

2. The method of claim 1 wherein the unfinished part is a factory manufactured unfinished part.

3. The method of claim 1 wherein step a) comprises:
   1) creating a computer model of the unfinished part; and
   2) creating the computer model of the tool through the use of the computer model of the unfinished part.

4. The method of claim 3 wherein step 1) comprises:
   i) deriving part parameters defining the unfinished part; and
   ii) inputting the part parameters into a computer aided design system.

5. The method of claim 4 wherein step ii) comprises:
   (a) using the inputted part parameters to formulate part commands for transmission to a computer aided manufacturing system.

6. The method of claim 5 wherein the computer aided manufacturing system is a computer numeric control system.

7. The method of claim 1 wherein step a) comprises:
   1) accessing a computer aided design system to retrieve the computer model of the tool corresponding to the unfinished part.

8. The method of claim 1 wherein step a) comprises:
   1) deriving tool parameters defining the tool, the tool parameters being derivable to correspondingly size and configure the tool to the unfinished part; and
   2) inputting tool parameters into a computer aided design system.

9. The method of claim 8 wherein the tool parameters are chosen from the group consisting of geometrical dimensions, size, thickness, texture, durability, shock resistance, dimensional stability, material characteristic, producibility, and combinations thereof.

10. The method of claim 1 wherein step b) comprises:
    1) translating the computer model into tool commands; and
    2) communicating the tool commands to a stereolithography apparatus.

11. The method of claim 10 wherein step 2) comprises:
    i) moving an irradiation source of the stereolithography apparatus over a liquid medium in response to the communicated tool commands, the liquid medium selectively transforming to a physical state upon exposure to the irradiation source.

12. The method of claim 11 wherein the liquid medium is a photopolymer resin medium.

13. The method of claim 1 wherein step b) comprises:
    1) defining a geometrical configuration of the tool; and
    2) positioning the unfinished part in abutting contact to the geometrical configuration of the tool, the geometrical configuration being receivable of the unfinished part when being positioned thereto.

14. The method of claim 13 wherein step 2) comprises:
    i) securing the unfinished part to the geometrical configuration of the tool; and
    ii) performing the desired tooling task upon the unfinished part to form the finished part.

15. An intermediate assembly for forming a finished part, the assembly comprising:
    an unfinished part; and
    a stereolithographically-created tool simulating a geometrical configuration of a work surface configured to complement the finished part after manufacture of the finished part, the geometrical configuration of the tool being sized and configured to receive the unfinished part when being positioned thereto to perform a desired tooling task thereupon to form the finished part engageable to the work surface without necessitating any substantial post-manufacture operation thereon.

* * * * *